US011119380B2

(12) United States Patent
Giaretta et al.

(10) Patent No.: US 11,119,380 B2
(45) Date of Patent: Sep. 14, 2021

(54) INDIUM PHOSPHIDE BASED OPTICAL TRANSMITTER WITH SINGLE PARAMETER DRIVEN PHASE CORRECTION FOR TEMPORAL VARIATION

(71) Applicant: NeoPhotonics Corporation, San Jose, CA (US)

(72) Inventors: Giorgio Giaretta, Mountain View, CA (US); Alessio Pirastu, Palo Alto, CA (US)

(73) Assignee: NeoPhotonics Corporation, San Jose, CA (US)

( * ) Notice: Subject to any disclaimer, the term of this patent is extended or adjusted under 35 U.S.C. 154(b) by 0 days.

(21) Appl. No.: 16/578,569

(22) Filed: Sep. 23, 2019

(65) Prior Publication Data

US 2020/0096834 A1 Mar. 26, 2020

Related U.S. Application Data

(60) Provisional application No. 62/734,346, filed on Sep. 21, 2018.

(51) Int. Cl.
*G02F 1/225* (2006.01)
*G02F 1/21* (2006.01)

(52) U.S. Cl.
CPC .......... *G02F 1/2255* (2013.01); *G02F 1/212* (2021.01); *G02F 2202/102* (2013.01)

(58) Field of Classification Search
CPC .......... G02F 1/2255; G02F 2001/212; G02F 2202/102

(Continued)

(56) References Cited

U.S. PATENT DOCUMENTS 7,389,053 B1   6/2008   Ilchenko et al.
7,697,793 B2   4/2010   Webster et al.
(Continued)

FOREIGN PATENT DOCUMENTS

WO   2017-079472 A1   5/2017

OTHER PUBLICATIONS

International Search report for co-pending application No. PCT/US2019/052393 dated Jan. 23, 2020.

*Primary Examiner* — Jerry M Blevins
(74) *Attorney, Agent, or Firm* — Christensen Fonder Dardi; Peter Dardi

(57) ABSTRACT

Optical modulators are described having a Mach-Zehnder interferometer and a pair of RF electrodes interfaced with the Mach-Zehnder interferometer in which the Mach-Zehnder interferometer comprises optical waveguides formed from semiconductor material. The optical modulator additionally comprises a plurality of phase shifters configured to interface with the plurality of interconnected optical waveguides such that at least one phase shifter of the plurality of phase shifters is interfaced with at least one optical waveguide of the plurality of interconnected optical waveguides. A phase shifter controller, including an energy source with a variable output controlled by the controller and a plurality of electrical connections connecting the energy source to each of the plurality of phase shifters, is also included. In various embodiments, the plurality of electrical connections are configured to provide approximately equal power to each of the phase shifting elements from the energy source.

14 Claims, 7 Drawing Sheets

(58) Field of Classification Search
USPC .............................................................. 385/3
See application file for complete search history.

(56) References Cited

U.S. PATENT DOCUMENTS

| | | |
|---|---|---|
| 9,128,348 B1 | 9/2015 | Yamazaki et al. |
| 9,294,200 B2 | 3/2016 | Mak et al. |
| 9,494,810 B2 | 11/2016 | Bhandare et al. |
| 2002/0191266 A1* | 12/2002 | Melloni ................... G02F 1/225 |
| | | 359/246 |
| 2011/0229070 A1 | 9/2011 | Doi et al. |
| 2013/0322809 A1* | 12/2013 | Goh ................... H04B 10/5053 |
| | | 385/3 |
| 2014/0153075 A1 | 6/2014 | Malacame et al. |
| 2015/0286108 A1* | 10/2015 | Prosyk ................... G02F 1/0123 |
| | | 385/3 |
| 2016/0248519 A1 | 8/2016 | Novack et al. |
| 2016/0357086 A1 | 12/2016 | Jewart et al. |
| 2017/0293165 A1 | 10/2017 | Kaneoka et al. |
| 2017/0331559 A1 | 11/2017 | Matsushita et al. |
| 2018/0252982 A1* | 9/2018 | Chen ................... G02F 1/2255 |
| 2018/0267340 A1* | 9/2018 | Rohde ................ H04B 10/5561 |
| 2019/0324298 A1 | 10/2019 | Dayel et al. |

\* cited by examiner

INDIUM PHOSPHIDE BASED OPTICAL TRANSMITTER WITH SINGLE PARAMETER DRIVEN PHASE CORRECTION FOR TEMPORAL VARIATION

CROSS REFERENCE TO RELATED APPLICATIONS

This application claims priority to U.S. provisional patent application 62/734,346 filed Sep. 21, 2018 to Giaretta et al., entitled "Indium Phosphide Based Optical Transmitter With Single Parameter Driven Phase Correction For Temporal Variation," incorporated herein by reference.

FIELD OF THE INVENTION

The invention relates to optical modulators that can be useful in optical communications for various information transfer, and further relates to bias control of optical modulators that can be implemented to adjust for bias fluctuations without operator intervention.

BACKGROUND

Optical modulators incorporating Mach-Zehnder interferometer structures can be used to impose RF modulation on an optical signal, such as light from a laser source. The RF modulation can encode information within the optical signal for transport to remote locations through an optical communications network. The encoded information can include, for example, data signals, voice signals, video signals and/or other communication information.

Generally, an MZM modulator is formed by splitting an input optical waveguide into two optical waveguide arms of a Mach-Zehnder Interferometer, in which the arms interface with fariofreuency (RF) electrodes. The RF electrodes operate as optical phase shifters due to electro-optic coupling. When recombined, the optical signals then interfere with one another based on the Mach-Zehnder interferometer structure. An RF signal can be superimposed onto the optical signal using the RF transmission line through alteration of the index of refraction of the optical waveguide by an electromagnetic RF signal. The optical waveguides for a RF driven modulator are generally formed with a semiconductor material. High fidelity transfer of the RF signal into modulation of the optical signal becomes more challenging as the frequency of the RF signal increases to accommodate higher bandwidth in the optical signal.

SUMMARY OF THE INVENTION

In a first aspect, the invention pertains to an optical modulator with bias control for coherent optical signals, the optical modulator comprising an optical input waveguide, an optical output waveguide, a plurality of interconnected optical waveguides, a plurality of RF electrodes, a plurality of phase shifters, a phase shifter controller, and a plurality of electrical connections. The plurality of interconnecting optical waveguides comprising a plurality of I-Q sets of Mach-Zehnder Interferometers (MZI), each of the plurality of I-Q sets comprising two interference coupled MZI, in which the plurality of I-Q sets are optically coupled through a splitter to the optical input waveguide and coupled through an optical combiner to the optical output waveguide. The plurality of RF electrodes can be configured to interface with the plurality of interconnected optical waveguides such that at least one RF electrode of the plurality of RF electrodes is interfaced with at least one optical waveguide of the plurality of interconnected optical waveguides. The plurality of phase shifters can be configured to interface with the plurality of interconnected optical waveguides such that at least one phase shifter of the plurality of phase shifters is interfaced with at least one optical waveguide of the plurality of interconnected optical waveguides. The phase shifter controller can comprise an energy source with a variable output controlled by the controller. Also, the plurality of electrical connections can connect the energy source to each of the plurality of phase shifters, in which the plurality of electrical connections are configured to provide approximately equal power to each of the phase shifting elements from the energy source.

In a further aspect, the invention pertains to a method for controlling the output of an optical modulator for coherent optical signals, in which the optical modulator comprises a plurality of interconnected optical waveguides comprising a plurality of I-Q sets of Mach-Zehnder Interferometers (MZI), each of the plurality of I-Q sets comprising two interference coupled MZI, wherein the plurality of I-Q sets are optically coupled through a splitter to an optical input waveguide and coupled through an optical combiner to an optical output waveguide, a plurality of phase shifters configured to interface with the plurality of interconnected optical waveguides such that at least one phase shifter of the plurality of phase shifters is interfaced with at least one optical waveguide of the plurality of interconnected optical waveguides, and a phase shifter controller comprising an energy source with a variable output controlled by the controller with a plurality of electrical connections connecting the energy source to each of the plurality of phase shifters, wherein the plurality of electrical connections are configured to provide approximately equal power to each of the phase shifting elements from the energy source. The method comprises applying an approximately equal power to each of the plurality of phase shifters to compensate for optical phase shifts due to temporal variations in the modulator performance.

Generally, in modulator systems described herein, bias control can be effectuated using phase shifters, such as thermo-optic phase shifters, that uniformly correct for bias fluctuation across multiple arms of Mach-Zehnder Interferometers (MZI) as well as across coupling of pairs of I-Q branches of the modulator. In certain embodiments, the optical modulator comprises an optical input waveguide, an optical output waveguide, and a plurality of interconnected optical waveguides including a plurality of I-Q sets of Mach-Zehnder Interferometers (MZI), each of the plurality of I-Q sets comprising two interference coupled MZI, wherein the plurality of I-Q sets are optically coupled through a splitter to the optical input waveguide and coupled through an optical combiner to the optical output waveguide. In a further aspect, the optical modulator additionally comprises a plurality of RF electrodes configured to interface with the plurality of interconnected optical waveguides that serve as arms of the nested MZI architecture such that at least one RF electrode of the plurality of RF electrodes is interfaced with one optical waveguide of the plurality of interconnected optical waveguides.

A plurality of phase shifters configured to interface with the plurality of interconnected optical waveguides such that at least one phase shifter of the plurality of phase shifters is interfaced with at least one optical waveguide of the plurality of interconnected optical waveguides. In still a further aspect, the optical modulator additionally comprises a phase shifter controller including an energy source with a variable output controlled by the controller, and a plurality of electrical connections connecting the energy source to each of the plurality of phase shifters, wherein the plurality of electrical connections are configured to provide approximately equal power to each of the phase shifting elements from the energy source.

Over time, the bias of the electronic modulation of an optical signal across an MZI can drift due to aging, environmental changes, such as temperature, or other factors. For embodiments of particular interest herein, based on the use of quality designed InP based optical waveguides in a modulator, the bias variations across the various MZI can be sufficiently close to each other that corrections for the bias can be performed uniformly across all of the MZI to provide for acceptable correction to the bias drift. Further, the bias fluctuations are primarily along a time frame significantly slower than the RF frequency of the optical modulation so that slower response thermo-optic phase shifters can be used to correct for the bias drift.

To improve signal fidelity from an optical telecommunications transmitter, automatic bias control can be implemented to adjust for bias fluctuations without operator intervention. Bias drift can result in deteriorated signal quality from the transmitter. Feedback control can be used to keep the bias within acceptable ranges. The designs herein are particularly suitable for a coherent modulator, such as an optical modulator designed around dual-polarization N-Quadrature Amplitude Modulation (QAM), where N is the number of symbols in the modulation constellation of the digital modulation system. For the modulator, in certain embodiments, there are generally twelve points of bias control along the optical waveguides. Specifically, these are the I, Q, and φ branches of the MZI for each of the X and Y components, as explained further below.

Coherent optical modulators comprise modulated signals in each of two polarization states. The two modulated polarizations are combined for directing the signal to the transmitter output. Each polarization state for QAM is modulated based on two phase shifted components, the in-phase (I component) and the quadrature phase (Q component). To modulate each of the phase components (I and Q), a Mach-Zehnder interferometer is used with RF modulation. For each polarization, a further MZI structure is used for each of the I and Q components to introduce modulation of these components. Thus, in one or more embodiments, each polarization can involve 3 MZI (I, Q, and I&Q) for a total of 6 MZI with 12 MZI arms since there are two for each. As described herein, in various embodiments the bias correction can be applied uniformly to all 12 MZI arms. Application of the bias correction in this way accounts for a majority of the bias correction while providing a significantly simplified system.

While the adjustment of the bias variation can be performed directly through a voltage adjustment of the RF modulation signal delivered to the optical waveguides, the designs herein involve separate phase shifting for bias correction. As recognized in the systems here, the bias variation adjustment generally involves fluctuations in a much slower time frame than the RF modulation frequency. Thus, the bias fluctuations can be performed using a phase shifter separately controlled from the RF modulation. Suitable phase shifters can be driven by heaters. Heating of the optical waveguides changes the index of refraction of the waveguide with a resulting phase shift of the light propagating through the waveguide. While thermal phase shifting has a significantly slower response time than RF modulation, the response time for thermal phase shifting is sufficient for adjustment of bias correction in the modulator.

As such, the approach herein based on thermal phase adjustment and uniform phase adjustment across the 12 MZI arms provides the following advantages:

Phase difference is linearly dependent on voltage;
Maximum active power dissipation due to phase shifter heaters can be reduced ($\pi/(2\pi+\varphi_a)$) if direction of aging can be predicted;
Mitigates impact of manufacturing phase offset for MZI;
Reduces number of connections outside of COS (six or seven phase connections instead of 12);
Reduced number of power supplies;
Higher frequency response of heaters (shorter heaters for same power budget);
Reduced optical insertion loss from shorter interferometer lengths;
Reduces modulator driver chip size.

A separate bias control using bias electrodes interfaced with the optical waveguides is described in published U.S. patent application 2017/0331559 to Matsushita et al., "entitled "Optical Transmitter," incorporated herein by reference. The '559 application does not describe thermal phase variation or common phase correction for the 6 Mach-Zehnder interferometers of the modulator. Thermal bias control is described in U.S. Pat. No. 7,697,793 to Webster et al., entitled "Silicon Modulator Offset Timing Arrangement," incorporated herein by reference. The '793 patent is specific for a modulator with silicon optical waveguides and with a single Mach-Zehnder Interferometer.

In addition, still further embodiments of the disclosure are directed to a method for controlling the output of an optical modulator for coherent optical signals comprising a plurality of interconnected optical waveguides including a plurality of I-Q sets of Mach-Zehnder Interferometers (MZI). In various embodiments the method comprises applying an approximately equal power to each of the plurality of phase shifters to compensate for optical phase shifts due to temporal variations in the modulator performance. In various embodiments the optical modular further comprises one or more optical taps positioned downstream of the optical combiner configured to sample the optical signal. In such embodiments, the method can further comprise determining an optical signal bias drift for the optical signal via the one or more optical taps and determining a phase correction for the determined optical signal bias drift.

Figure 1:
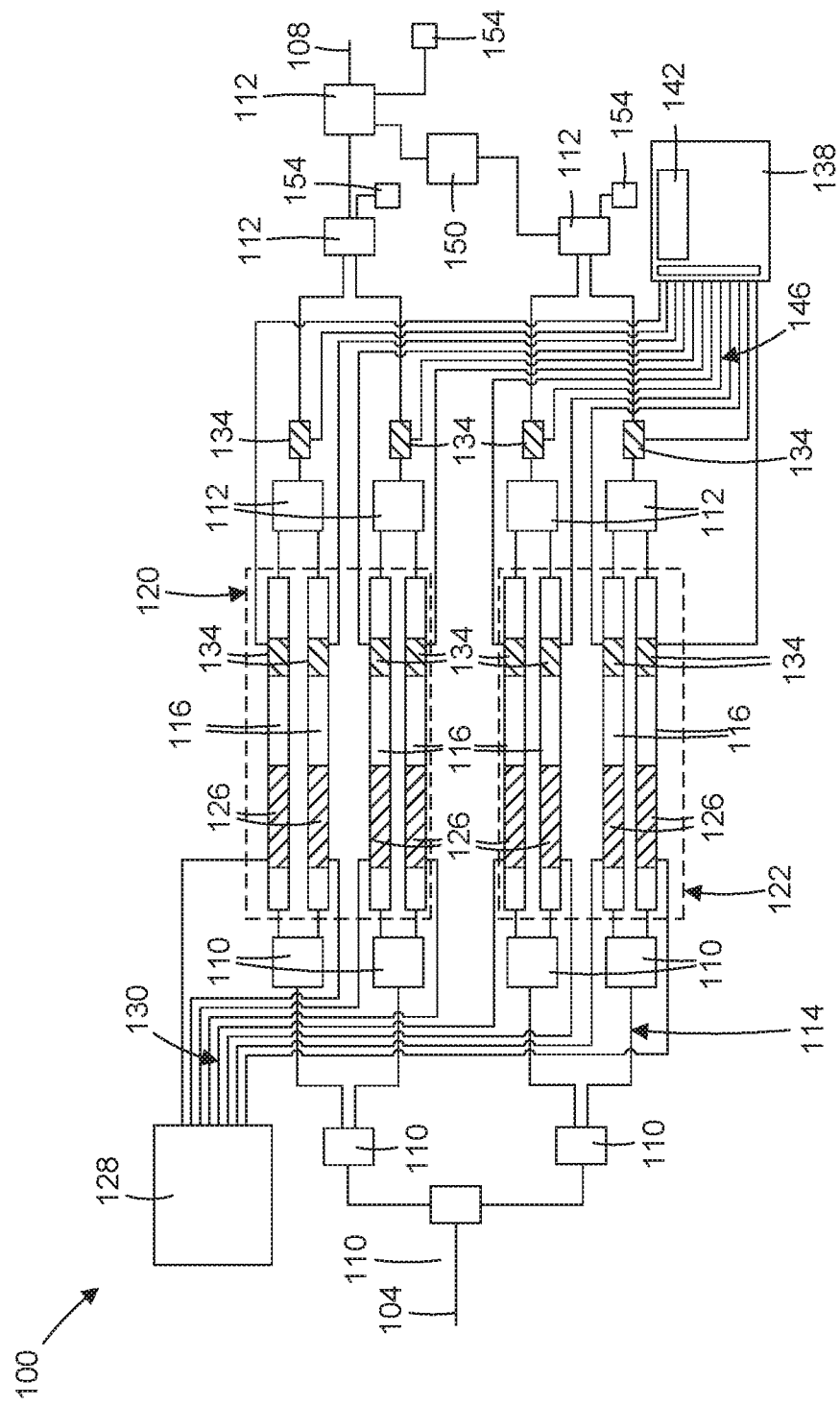
FIG. 1 depicts a schematic layout of an optical modulator, according to one or more embodiments of the disclosure.

While the embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION OF THE INVENTION

Referring to FIG. 1, a schematic layout of an optical subsystem including a coherent QAM based optical-RF modulator 100 is depicted, according to one or more embodiments. In various embodiments, the modulator 100 comprises an optical input waveguide 104 and optical output waveguide 108 that are connected through a series of optical splitters 110 and optical couplers 112 that split an input optical signal to direct the signal through a plurality of interconnected optical waveguides 114, including a plurality of nested Mach-Zehnder Interferometers (MZI) 116, each comprising optical semiconductor material. The modulator structure of FIG. 1 is consistent with an adopted standard, see FIG. 2.1 of Optical Internetworking Forum, Implementation Agreement for High Bandwidth Coherent Driver Modulator (HB-CDM), IA #OIF-HB-CDM 01.0, Nov. 30, 2018, incorporated herein by reference.

In one or more embodiments, the interconnected optical waveguides includes a first set 120 of MZI 166, shown in FIG. 1 as the upper four MZI arms 116 of modulator 100, which are used to modulate a first phase of the input optical signal. The two upper arms correspond collectively to an arm of an MZI for the I&Q level of the nested MZI, and the two lower arms correspond with the other arm of the I&Q level of the nested MZI. Similarly, the interconnected optical waveguides includes a second set 122 of MZI arms 116, shown in FIG. 1 as the lower four MZI arms 116 of modulator 100, which are used to modulate a second phase of the input optical signal. Again, the two upper arms correspond collectively to an arm of an MZI for the I&Q level of the nested MZI, and the two lower arms correspond with the other arm of the I&Q level of the nested MZI. Thus, each of the first set 120 and second set 122 are configured as an I-Q set of MZI, where two MZI arms 116 are configured as I components while two other arms 116 are configured as Q components, while the combined I and Q sets are then also arms of the I&Q level MZI.

In various embodiments, the modulator 100 includes a plurality of radio frequency (RF) electrodes 126 configured to interface with the plurality of interconnected optical waveguides 114 such that at least one RF electrode 126 of the plurality of RF electrodes 126 is interfaced with each MZI arm 116. In addition, in one or more embodiments the modulator 100 includes an RF driver 128 and a plurality of RF connections 130 connecting the RF driver 128 to each of the plurality of RF electrodes 126. In various embodiments, in operation, the RF electrodes 126 are configured to provide an electro-optical modulation of the signal across each of the MZI arms 116 from the interaction of an electric field with the optical material. As such, in various embodiments the plurality of RF connections 130 are configured to apply a voltage or RF electrical signal from the RF driver 128 to the plurality RF electrodes 126.

In various embodiments, modulator 100 includes a plurality of phase shifters 134 configured to interface with the plurality of interconnected optical waveguides 114 such that at least one phase shifter 134 is interfaced with each MZI arm 116. In addition, in one or more embodiments the modulator 100 includes a phase shifter controller 138 including an energy source 142 with a variable output controlled by the controller 138. In various embodiments, the controller 138 is a logic device comprising processing and memory capabilities, such as a digital processor, for executing various program instructions. As such, in various embodiments the controller 138 is capable of implementing various methods or processes, including those described herein. In one or more embodiments, in operation, the phase shifters 134 are configured to produce an optical phase shift of an optical signal traveling through the MZI arms 116. As such, in various embodiments a plurality of electrical connections 146 are configured to connect the energy source 142 to each of the plurality of phase shifters 134. In one or more embodiments the plurality of electrical connections 146 comprise parallel electrical connections between the controller 138 and the individual phase shifters 134. As a result, in various embodiments, the plurality of electrical connections 146 are configured to provide approximately equal power to each of the phase shifting elements 134 from the energy source 138. As described above, because the bias variations across the various MZI arms 116 are sufficiently close, corrections for that bias can be performed via a uniformly applied correction across all of the MZI arms 116.

In various embodiments, the phase shifters 134 comprise a resistive heating element that is configured to generate heat in response to an applied voltage and thereby shift the optical phase of an optical signal traveling through the arms 116. As such, in various embodiments, a voltage can be applied to the heater elements from the energy source 142 to heat the optical waveguide to change the index of refraction of the waveguide with a resulting phase shift of the light propagating through the waveguide. Over conventional operational ranges, the phase shift is proportional to the square of applied voltage such that a desired phase shift can be straightforwardly applied. The phase shifter can comprise a resistive heating material that generates heat with current flow. Typically, a thermo-optic phase shifter is formed by depositing a thin film of metal onto the top cladding above the optical waveguide. The metal film or semiconductor film can be patterned to define the boundaries of the heater. Desirable metal materials for heaters resist corrosion and are generally durable, such as tungsten, nickel-chromium alloys (nichrome), and other metals, such as those known in the art. Methods for forming heaters for PLCs include deposition by sputtering, other physical vapor deposition, or other suitably process followed by patterning.

In such embodiments, the heating elements are configured to operate in accordance with logic or program instructions executed by the controller 142 that relatively changes the optical phase of input light. For example, in certain embodiments $V_{bias}$ is applied to heating elements to change the optical phase of input signals. In such embodiments, the resulting phase shift is linear with heater power (voltage squared), which we can compensate for by transforming our target phase, such as according to the relationship: $V = V_0 + \sqrt{\alpha \phi}$; where $\alpha$ is a parameter controlling the anharmonic character with $\alpha \geq 1.1$, $\phi$ is the bias voltage, and where $V_0$ is the initial voltage.

Because the voltage bias drift occurs over minutes, rather than milliseconds or nanoseconds of RF, the voltage bias correction can be performed using heating element phase shifters 134 to shift the phase even though the heating elements have a relatively slow response time relative to the RF electrode modulation. While thermal phase shifting has a significantly slower response time than RF modulation, the response time for thermal phase shifting is sufficient for adjustment of bias shifting in the modulator. Thus, in various embodiments the bias fluctuations can be performed using phase shifters 134 that are separately controlled from the RF electrodes 126 and RF modulation.

In one or more embodiments, a modulated signal results from each of the four pairs of MZI 116. The I and Q components of the modulated signal are then optically combined at combiners 112 to form the optical output for each of the two polarizations. In various embodiments, one of the signals passes through a 90 degree polarizer 150 to rotate the polarization relative to the other signal prior to combining the two polarizations. Optical taps 154 can be used to sample the optical signal to evaluate the resulting optical signal. As seen in FIG. 1, a plurality of optical taps 154 are positioned to sample the optical signal downstream of optical couplers 112. Based on the measured bias fluctuations, an effective uniform phase correction is evaluated with feedback control used to automatically keep the bias within acceptable ranges without operator intervention. The phase correction is applied uniformly to the 12 MCI arms through the application of a voltage to the thermal phase shifters 134, as described above.

While in general, the designs of the modulator bias control can be directed to various semiconductor materials for the modulator optical waveguides, these designs are particularly useful for InP based optical modulators. Based on InP optical waveguide fabrication approaches presently available, the InP waveguides within the nested MZI architecture can be made with a high degree of uniformity. Due to this high degree of uniformity, the designs herein are able to adequately adjust for bias variation in the modulator signals. In addition to the description above, a specific designs for an optical modulator especially useful for InP based modulators are described in published U.S. patent application 2018/0252982 to Chen et al., entitled "High Frequency Optical Modulator With Laterally Displaced Conduction Plane Relative to Modulating Electrodes," incorporated herein by reference. The semiconductor waveguides generally comprise different layers with selected doping for improved interfacing with the RF electrodes. The optical waveguides can be formed using chemical vapor deposition and photolithography or the like, and the RF electrodes can be deposited with sputtering or other physical vapor deposition approaches.

Figure 2:
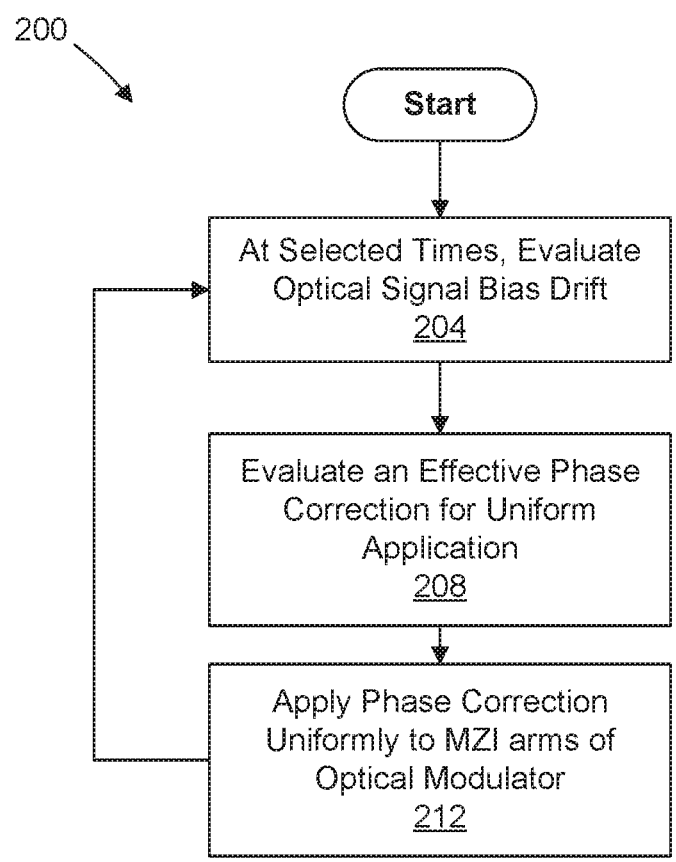
FIG. 2 depicts a method of phase correction, according to one or more embodiments of the disclosure.

Referring to FIG. 2, a method 200 for phase correction/control of the output of an optical modulator for coherent optical signals is depicted, according to one or more embodiments. In one or more embodiments, the method 200 includes, at operation 204, evaluating, at selected times, optical signal bias drift and, at operation 208, evaluating an effective phase correction for uniform application. As described above with reference to FIG. 1, in various embodiments, a modulated signal results from MZI 116 which are then optically combined to form an optical output. Optical taps 154 can be used to sample the optical signal to evaluate the resulting optical signal. Based on the measured bias fluctuations, an effective uniform phase correction is evaluated with feedback control used to automatically keep the bias within acceptable ranges without operator intervention. In one or more embodiments, the method 200 includes, at operation 212, applying a phase correction uniformly to the MZI arms of the optical modulator to compensate for optical phase shifts due to temporal variations in the modulator performance. Approaches for evaluation of bias drift are generally known in the art, and some approaches to evaluate bias drift are described further in co-pending U.S. patent application Ser. No. 16/389,295 to Dayel et al., entitled "Method and Apparatus for Bias Control with a Large Dynamic Range for Mach-Zehnder Modulators," incorporated herein by reference.

Figure 3A:
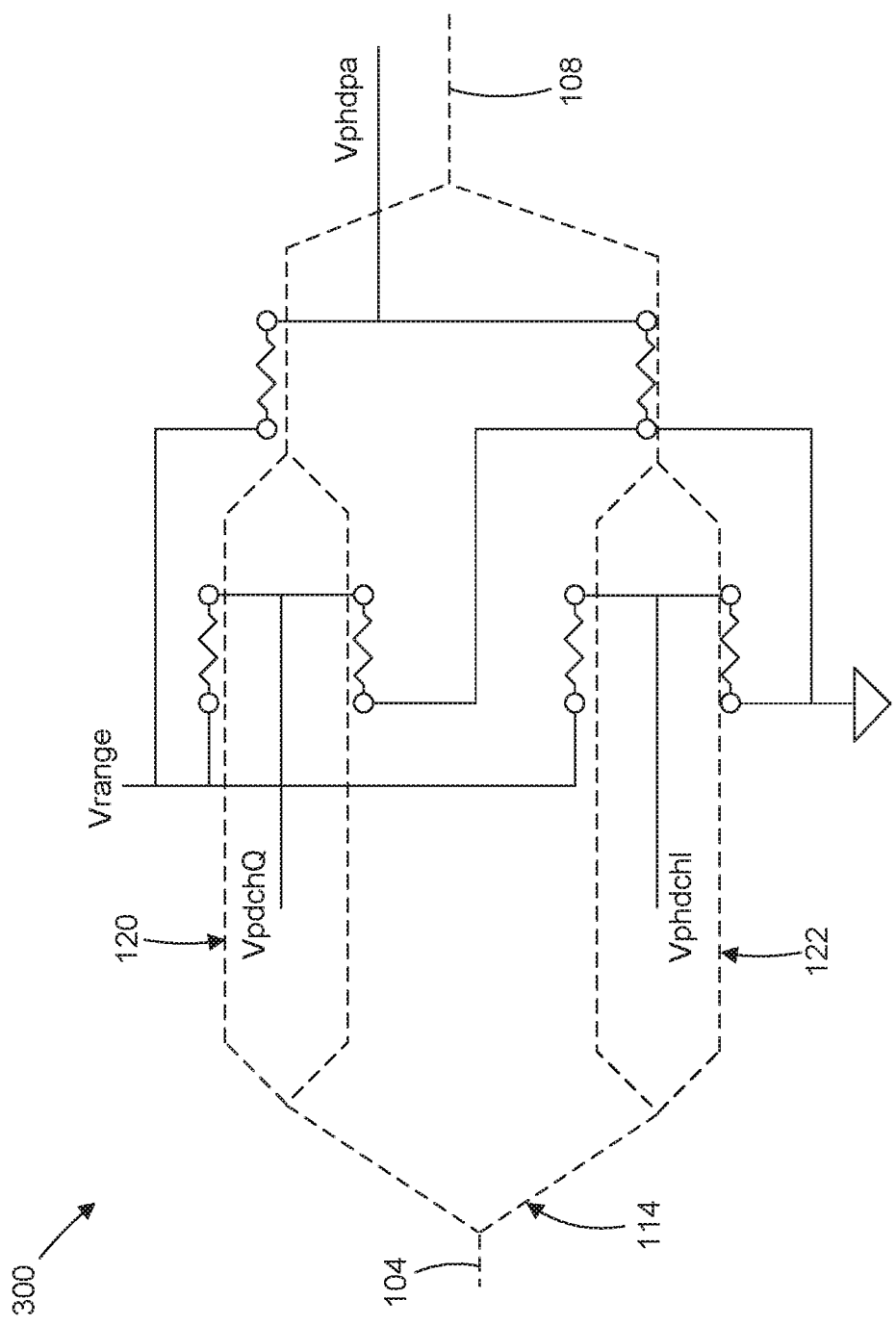
FIGS. 3A-3B depict a schematic diagram of one phase of an optical signal modulator in which the MZI branches have a common ground and common voltage range (Vrange), according to one or more embodiments of the disclosure.
Figure 3B:
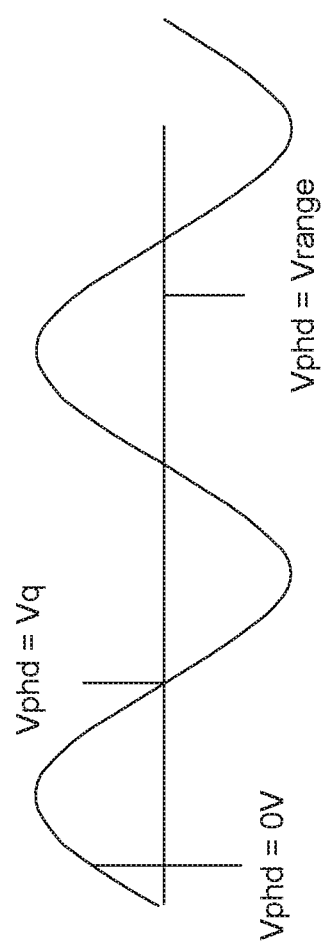

Referring to FIGS. 3A and 3B, a schematic diagram of a modulator 300 is depicted, according to one or more embodiments of the disclosure. As described above, in various embodiments, the modulator 300 is substantially similar with modulator 100 in FIG. 1. As such, like elements are referenced with like reference numerals. In various embodiments, the modulator 300 comprises an optical input waveguide 104 and optical output waveguide 108 that are connected through a plurality of interconnected optical waveguides 114. As described above, the interconnected optical waveguides 114 includes a first set 120 of MZI, which are used to modulate a first phase of the input optical signal, and a second set 122 of MZI, which are used to modulate a second phase of the input optical signal. Each of the first set 120 and second set 122 are configured as an I-Q set of MZI, including two MZI arms configured as I components while two other arms are configured as Q components.

Depicted in FIGS. 3A and 3B, the basic set up of one phase of the modulation is depicted in which the MZI branches have a common ground and common voltage range (Vrange). The evaluation of the bias fluctuation based on the measurement of the optical output is described in U.S. Pat. No. 9,294,200 to Mak et al., entitled "Optimum Modulator Bias Systems and Methods in Coherent Optical Transmitters," incorporated herein by reference. Based on reasonable assumptions, the measured optical power for each MZI arm can be written as:

$$P=2(1-\cos(\pi(V+PH)));$$

where V is the RF modulation voltage and PH is the phase.

Thus, in the approach herein, PH is set to be the same for each of the 12 MZI arms. Quadrature point Vphd is generally different for each MZI depending on process control. Initial Vphd value is not more than Vpi from the half way point between 0 and Vrange. Vrange can be chosen as the largest for all 6 interferometers (2Q, 2I and 1 for each phase combining Q & I). Vrange can be Vpi+aging margin, e.g., Vpi/2.

Figure 4A:
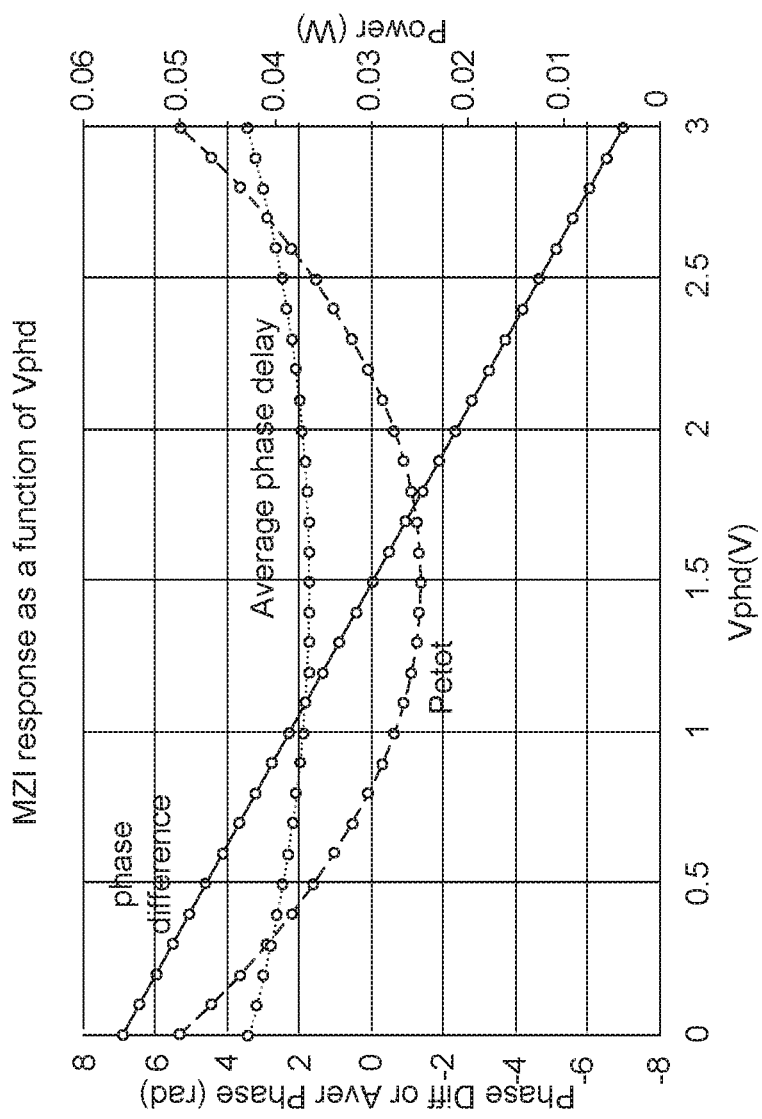
FIGS. 4A-4B depict a model for phase response, according to one or more embodiments of the disclosure.
Figure 4B:
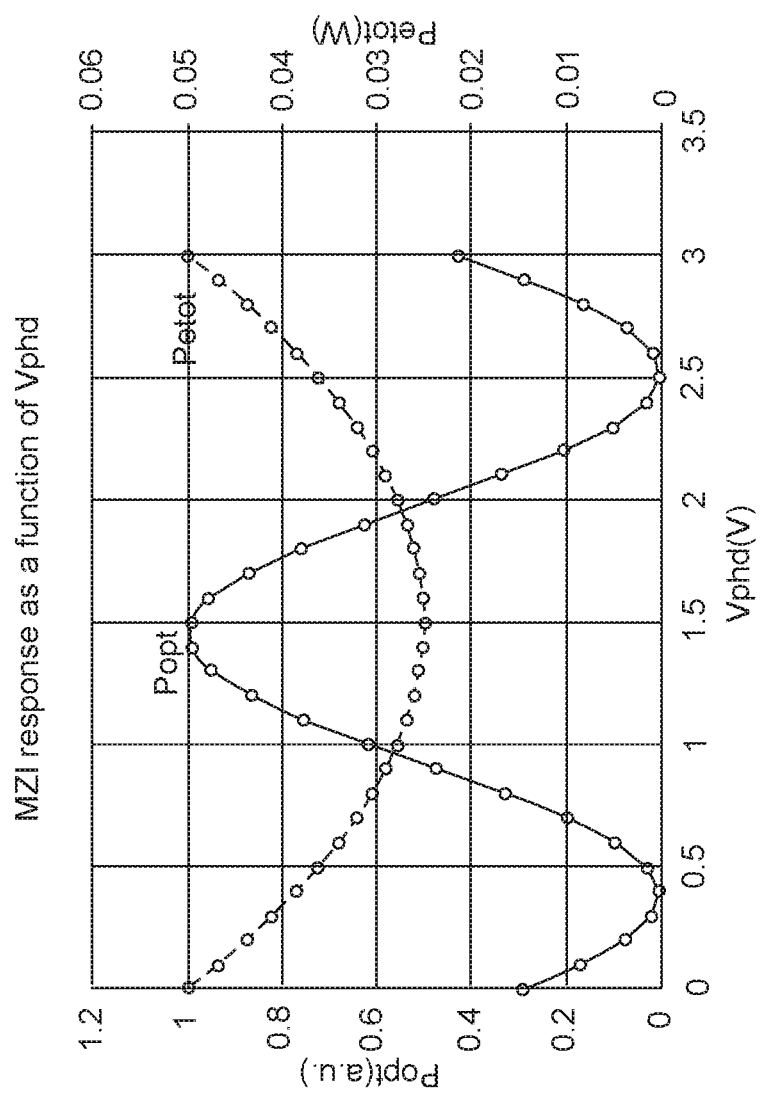
Figure 5:
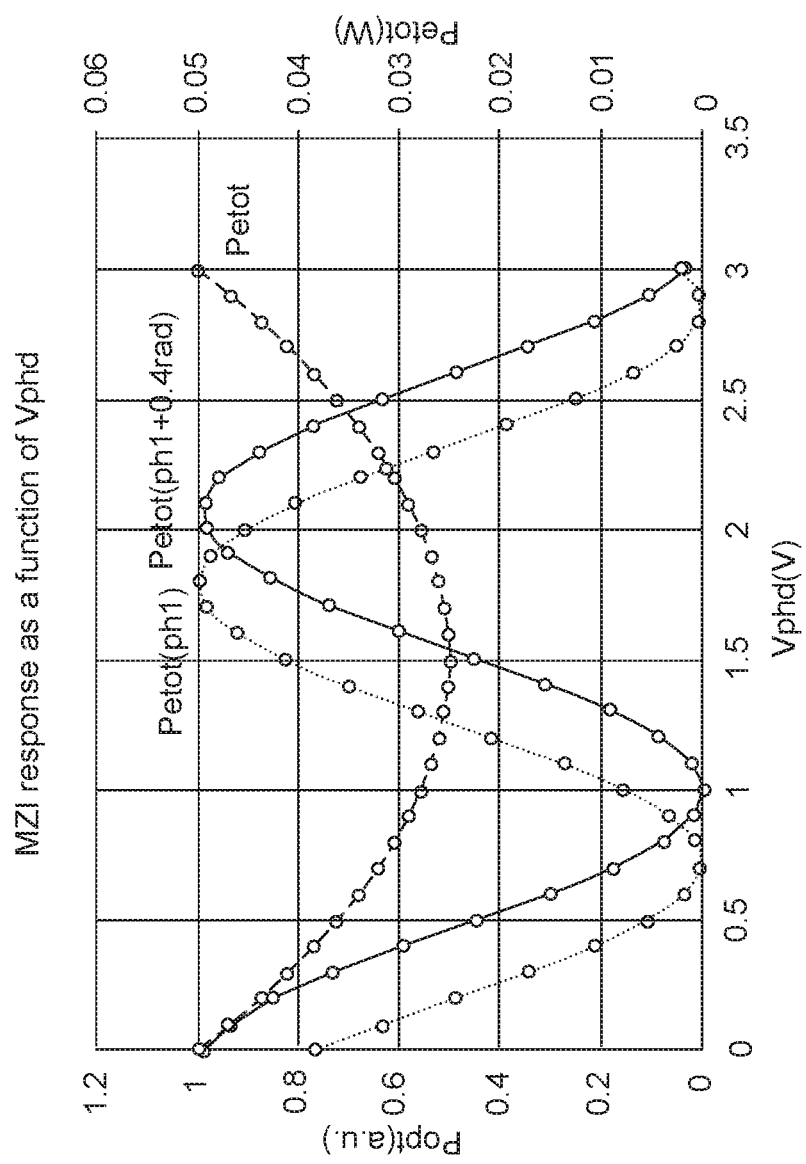
FIG. 5 depicts the effect of phase aging on process control for the model in FIGS. 4A-4B, according to one or more embodiments of the disclosure.

Referring to FIGS. 4A-4B, a model for phase response is shown in a plot of MZI response as a function of Vphd, according to one or more embodiments. Referring to FIG. 5, the effect of phase aging on process control for the model in FIGS. 4A-4B is shown.

The embodiments above are intended to be illustrative and not limiting. Additional embodiments are within the claims and inventive concepts. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein. To the extent that specific structures, compositions and/or processes are described herein with components, elements, ingredients or other partitions, it is to be understand that the disclosure herein covers the specific embodiments, embodiments comprising the specific components, elements, ingredients, other partitions or combinations thereof as well as embodiments consisting essentially of such specific components, ingredients or other partitions or combinations thereof that can include additional features that do not change the fundamental nature of the subject matter, as suggested in the discussion, unless otherwise specifically indicated.

What is claimed is:

1. An optical modulator with bias control for coherent optical signals, the optical modulator comprising:
   an optical input waveguide;
   an optical output waveguide;
   a plurality of interconnected optical waveguides comprising a plurality of I-Q sets of Mach-Zehnder Interferometers (MZI), each of the plurality of I-Q sets comprising two interference coupled MZI, wherein the plurality of I-Q sets are optically coupled through a splitter to the optical input waveguide and coupled through an optical combiner to the optical output waveguide;
   a plurality of RF electrodes configured to interface with the plurality of interconnected optical waveguides such that at least one RF electrode of the plurality of RF electrodes is interfaced with at least one optical waveguide of the plurality of interconnected optical waveguides;
   a plurality of phase shifters configured to separately interface with the plurality of interconnected optical waveguides such that at least one phase shifter of the plurality of phase shifters is interfaced separate from any RF electrode with at least one optical waveguide of the plurality of interconnected optical waveguides;
   a phase shifter controller comprising an energy source with a variable output controlled by the controller; and
   a plurality of electrical connections connecting the energy source to each of the plurality of phase shifters, wherein the plurality of electrical connections are configured to provide approximately equal power to each of the phase shifting elements from the energy source;
   wherein the plurality of I-Q sets comprises six coupled MZI with twelve corresponding MZI arms, wherein I&Q MZI have arms that each comprise an I MZI or a Q MZI, and wherein the twelve MZI arms have a common ground and common voltage range.

2. The optical modulator of claim 1 wherein the interference coupled MZI of the plurality of I-Q sets comprise InP-based optical waveguides.

3. The optical modulator of claim 1 further comprising:
   an RF driver; and
   a plurality of RF connections respectively connecting the RF driver to each of the plurality of RF electrodes, wherein the plurality of RF connections are configured to apply a voltage from the RF driver to the plurality of RF electrodes.

4. The optical modulator of claim 1 wherein the plurality of phase shifters positioned along the optical waveguide downstream of the plurality of RF electrodes.

5. The optical modulator of claim 1 further comprising one or more optical taps positioned downstream of the optical combiner, the one or more optical taps configured to sample an optical signal to evaluate the bias fluctuations.

6. The optical modulator of claim 1 wherein the plurality of electrical connection comprise parallel electrical connections between the controller and the individual phase shifters and wherein the individual phase shifters comprise a resistive heating element with a thin metal film.

7. The optical modulator of claim 1 wherein three nested MZI modulate a first output signal from the optical combiner of the I&Q MZI and three other nested MZI modulate a second output signal from the optical combiner of the I&Q MZI that is directed through a polarizer prior to recombining with the first output signal to form a combined output signal with distinct modulations for two polarizations.

8. A method for controlling the output of an optical modulator for coherent optical signals comprising a plurality of interconnected optical waveguides comprising a plurality of I-Q sets of Mach-Zehnder Interferometers (MZI), each of the plurality of I-Q sets comprising two interference coupled MZI, wherein the plurality of I-Q sets are optically coupled through a splitter to an optical input waveguide and coupled through an optical combiner to an optical output waveguide, a plurality of phase shifters configured to separately interface with the plurality of interconnected optical waveguides such that at least one phase shifter of the plurality of phase shifters is interfaced separate from any RF electrode with at least one optical waveguide of the plurality of interconnected optical waveguides, and a phase shifter controller comprising an energy source with a variable output controlled by the controller with a plurality of electrical connections connecting the energy source to each of the plurality of phase shifters, wherein the plurality of electrical connections are configured to provide approximately equal power to each of the phase shifting elements from the energy source, wherein the plurality of I-Q sets comprises six coupled MZI with twelve corresponding MZI arms and wherein the twelve MZI arms have a common ground and common voltage range, the method comprising:
   applying an approximately equal power to each of the plurality of phase shifters to compensate for optical phase shifts due to temporal variations in the modulator performance.

9. The method of claim 8 wherein the optical modular further comprises one or more optical taps positioned downstream of the optical combiner configured to sample the optical signal, and wherein the method further comprises:
   determining an optical signal bias drift for the optical signal via the one or more optical taps.

10. The method of claim 9 further comprising:
    determining a phase correction for the determined optical signal bias drift.

11. The method of claim 8 wherein the interference coupled MZI of the plurality of I-Q sets comprise InP-based optical waveguides.

12. The method of claim 8 wherein the optical modular further comprises a plurality of RF electrodes configured to interface with the plurality of interconnected optical waveguides such that at least one RF electrode of the plurality of RF electrodes is interfaced with at least one optical waveguide of the plurality of interconnected optical waveguides.

13. The method of claim 12 wherein the optical modular further comprises an RF driver and a plurality of RF connections connecting the RF driver to each of the plurality of RF electrodes, wherein the plurality of RF connections are configured to apply a voltage from the RF driver to the plurality RF electrodes.

14. The method of claim 13 wherein the plurality of phase shifters of the optical modular are positioned on the optical waveguides downstream of the plurality of RF electrodes.

* * * * *